United States Patent [19]

Cadmus

[11] 3,764,528
[45] Oct. 9, 1973

[54] PROCESS FOR REMOVAL OF SOLUBLE MERCURY RESIDUES FROM AQUEOUS PROCESS STREAMS

[75] Inventor: Eugene L. Cadmus, Andover, Mass.

[73] Assignee: Ventron Corporation, Beverly, Mass.

[22] Filed: Nov. 8, 1971

[21] Appl. No.: 196,762

[52] U.S. Cl.................. 210/50, 210/62, 75/109, 423/103
[51] Int. Cl.............................. C02b 1/36, C02c 5/02
[58] Field of Search.................. 75/108, 109, 121; 210/42, 48, 50, 59, 62; 252/188; 423/99, 101–104, 279, 283

[56] References Cited
UNITED STATES PATENTS

| 3,695,838 | 10/1972 | Knepper et al. | 75/109 X |
| 2,981,682 | 4/1961 | Lancy | 210/62 |
| 2,856,428 | 10/1958 | Brown | 252/188 X |
| 3,014,025 | 12/1961 | Pearson et al. | 252/188 X |
| 3,674,428 | 7/1972 | Dean et al. | 210/50 X |

OTHER PUBLICATIONS

Gibb, Thomas R. P., Jr., "Hydrides," Journal of Chemical Education, October, 1948, pp. 577–582.

*Primary Examiner*—Samih N. Zaharna
*Assistant Examiner*—Thomas G. Wyse
*Attorney*—J. Harold Boss

[57] ABSTRACT

The invention contemplates the removal of soluble inorganic mercury compounds from waste streams by mixing with the stream an amount of sodium borohydride about 100 to 150 percent in excess of the stoichiometric amount required to reduce its inorganic mercury content to metal as a precipitate. If organic mercurials are present in the stream, they are converted to soluble inorganic mercury salts by chlorination of the stream before mixing the stream with borohydride.

1 Claim, No Drawings

PROCESS FOR REMOVAL OF SOLUBLE MERCURY RESIDUES FROM AQUEOUS PROCESS STREAMS

The invention contemplates the removal of soluble mercury residues from aqueous process waste streams.

The recovery of mercury from chemical process waters, such as brine solutions from mercury-cell chlorine-caustic production, or the mercury-catalyzed sulfonation of anthraquinone, has both economic and ecological importance. Discussions of the environmental aspects of mercury often do not consider the importance of solubility in the discharge of mercury in process wastes. The solubility of mercury in air-free water is only 0.06 mg./l at 25°C, increasing regularly with temperature to 0.3 mg./l at 85°C. More importantly, the solubility of mercury involves oxidation, and the presence of air will increase the solubility of mercury in water to a level approaching the saturation concentration of mercury oxide - about 40 mg./l at 25°C; if chlorides are also present, solubilities as high as 650 mg./l are possible.

The solubility of mercury through its rather easy oxidation means that simple mechanical separation of mercury from process wastes will not guarantee the absence of mercury in effluent, and the discharge of mercury in clear, fitered or settled wastes, can reach significant levels. However, if mercury can be kept in its reduced, elemental, state, in a reducing environment, its solubility will be depressed to acceptable levels.

Recovery methods usually involve either extraction, insolubilization or reduction. Extraction of dissolved mercury by adsorption on activated carbon is not economical because of the limited capacity of the carbon and the difficult removal of the mercury from the carbon. Insolubilization as the sulfide is slow, pH-dependent, and a soluble complex, $HgS_2^=$, is formed with an excess of sulfide. Displacement of mercury by reduction wth zinc, copper, iron, etc., is slow and uncertain, and requires further treatment of the amalgam. Formaldehyde and hypophosphorous acid are effective reducing agents, but only with prolonged reaction times and usually some heat.

None of these methods can be applied to solutions of organic mercury compounds: the organomercurials are not adsorbed; the organomercury sulfides are unstable, decomposing to give volatile di alkyl or diphenyl mercury; the $R_2Hg$ compounds are also formed when organomercurials are reduced.

In accordance with the present invention an amount of sodium borohydride about 100 to 150 percent in excess of the stoichiometric amount required to reduce the inorganic salts in the waste stream is mixed with the stream while maintaining the pH of the stream between about 7 to 12. If organic mercurials are present in the stream, it is first chlorinated to convert the organic mercurials to inorganic mercuric chloride and excess chlorine is removed before mixing the sodium borohydride with the stream. By using an excess of sodium borohydride, re-oxidation and re-solution of the reduced mercury is prevented. Allowance must be made for other reducible compounds present.

For process streams known to contain only inorganic mercury, $NaBH_4$ reduction, followed by filtration, can be used directly: 100 ml of a solution containing 66.5 ppm of Hg as $HgCl_2$ was adjusted to pH 7, and a 5 ml of a 1% solution of $NaBH_4$ were added with stirring and allowed to react for 1 hour. One gram of filter aid (Dicalite Speed Plus) was added and the solution filtered through an asbestos mat. The filtrate contained less than 0.4 ppm of mercury. The same solution treated with $NaBH_4$, without pH adjustment to 7, but run at a pH of 12, left 1.65 ppm of Hg in solution after filtration.

Temperature is not critical, and recoveries are conveniently done at ambient temperature, although the rate of decomposition of $NaBH_4$ increases with temperature, and at temperatures greater than 50°C decomposition may be too rapid for efficient reduction.

A sample of process waste from the manufacture of phenyl mercuric acetate contained 8.86 grams/liter of mercury, 4.34 grams/liter as inorganic mercury (mercuric acetate), and the balance, 4.52 grams/liter as PMA. The solution was made alkaline with NaOH to a pH of 10, and chlorine gas passed through. Samples were withdrawn periodically, boiled to expel chlorine, treated with $NaBH_4$ and filtered:

| Sample No. | Chlorination Time (Minutes) | Sodium Borohydride Recovery %Hg as Metal | %Hg not Recovered |
|---|---|---|---|
| 1 | 0 | 49.8 | 6.8 |
| 2 | 15 | 68.3 | 4.0 |
| 3 | 30 | 95.7 | 0.2 |
| 4 | 60 | 98.8 | 0.0 |
| 5 | 150 | 99.6 | 0.0 |

An industrial application - at Wood Ridge - takes process waste from both inorganic and organic mercury production, and after treatment of the organic stream to remove organic mercury, a waste solution containing 30 to 300 ppm of mercury is treated at pH 7, with 3 gals, of 12% $NaBH_4$ per 5,000 gals. of waste. After a reaction time of 1 hour, the slurry is pumped to a settling tank where the bulk of the mercury sludge settles. The solution decanted from the settling tank contains about 10 ppm of Hg suspended and then discharged as plant effluent. When the filters were of 5 micron size, Hg in the effluent was 3 to 4 ppm; when 1 micron filters were used, the concentration of Hg in the final effluent was 0.5 ppm.

The Hg level can be reduced even further - to less than 0.1 ppm - if a final filtration through activated carbon is used.

I claim:

1. In a method for removal of soluble mercury residues from an aqueous waste stream, the steps which comprise subjecting said stream to chlorination to convert organic mercurials to inorganic mercuric chloride, removing excess chlorine from the stream, mixing with said stream an amount of sodium borohydride about 100 to 150 percent in excess of the stoichimetric amount required to reduce the inorganic mercury salt content to metal as a precipitate and reduce any other reducible material in the stream while maintaining the pH of the stream at between about 7 to 12, and removing the precipitated mercury metal from the stream.

* * * * *